United States Patent
Komiyama et al.

(10) Patent No.: US 9,316,185 B2
(45) Date of Patent: Apr. 19, 2016

(54) INTAKE AIR COOLING APPARATUS FOR STATIONARY INTERNAL COMBUSTION ENGINE

(75) Inventors: Masahito Komiyama, Tokyo (JP); Hiroshi Fukushi, Tokyo (JP); Kiwamu Inoue, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 346 days.

(21) Appl. No.: 14/007,007

(22) PCT Filed: Mar. 8, 2012

(86) PCT No.: PCT/JP2012/056022
§ 371 (c)(1),
(2), (4) Date: Sep. 24, 2013

(87) PCT Pub. No.: WO2012/132825
PCT Pub. Date: Oct. 4, 2012

(65) Prior Publication Data
US 2014/0007853 A1 Jan. 9, 2014

(30) Foreign Application Priority Data
Mar. 31, 2011 (JP) .................... 2011-077389

(51) Int. Cl.
*F02M 35/10* (2006.01)
*F02B 29/04* (2006.01)
(Continued)

(52) U.S. Cl.
CPC *F02M 35/10* (2013.01); *F01P 3/20* (2013.01); *F01P 9/06* (2013.01); *F02B 29/0412* (2013.01);
(Continued)

(58) Field of Classification Search
CPC .. F02B 29/0412; F02B 29/0493; F02B 37/00; F02M 35/10; F01P 3/20; F01P 9/06; Y02T 10/146
See application file for complete search history.

(56) References Cited

U.S. PATENT DOCUMENTS

| 4,270,365 A | 6/1981 | Sampietro |
| 5,797,265 A | 8/1998 | Hagglund |

(Continued)

FOREIGN PATENT DOCUMENTS

| CN | 101855428 A | 10/2010 |
| EP | 0750106 A1 | 12/1996 |

(Continued)

OTHER PUBLICATIONS

Notice of Allowance effective Feb. 25, 2015 issued in corresponding Korean Application No. 10-2013-7025126 with English translation.
(Continued)

*Primary Examiner* — Hieu T Vo
(74) *Attorney, Agent, or Firm* — Birch, Stewart, Kolasch & Birch, LLP

(57) ABSTRACT

A water-saving intake air cooling apparatus for a stationary internal combustion engine includes a primary intake air cooler, a high temperature side intake air cooler, and a low temperature side intake air cooler in an intake air passage upstream and downstream of a turbo charger. A first radiator transfers cooling water to an absorption chiller. The absorption chiller transfers cooling water to the primary intake air cooler and to the low temperature side intake air cooler. A second radiator transfers cooling water to the high temperature side intake air cooler. A third radiator cools lubricating oil flowing through a lubricating oil circulation space. Steam is generated by an exhaust heat boiler provided in an exhaust gas passage, and the steam is supplied to the absorption chiller as a heat source. Such use of the first, second, and third radiators, reduces the need for cooling water.

10 Claims, 2 Drawing Sheets

(51) Int. Cl.
*F01P 3/20* (2006.01)
*F01P 9/06* (2006.01)
*F01N 5/02* (2006.01)
*F02B 37/00* (2006.01)

(52) U.S. Cl.
CPC .............. *F02B 29/0443* (2013.01); *F01N 5/02* (2013.01); *F01P 2060/02* (2013.01); *F02B 37/00* (2013.01); *Y02T 10/146* (2013.01)

(56) References Cited

U.S. PATENT DOCUMENTS

| | | | | |
|---|---|---|---|---|
| 6,681,171 | B2* | 1/2004 | Rimnac | ................. F02D 41/005 123/568.22 |
| 8,051,842 | B2* | 11/2011 | Hagelstein | .......... F02B 29/0437 123/568.12 |
| 2009/0031999 | A1 | 2/2009 | Erickson | |
| 2009/0049836 | A1 | 2/2009 | Erickson et al. | |

FOREIGN PATENT DOCUMENTS

| | | | | |
|---|---|---|---|---|
| GB | 2432205 | A | | 5/2007 |
| JP | 58-79618 | A | | 5/1983 |
| JP | 3-95028 | U | | 9/1991 |
| JP | 9-4510 | A | | 1/1997 |
| JP | 9-88742 | A | | 3/1997 |
| JP | 2001-50055 | A | | 2/2001 |
| JP | 2001132538 | A | * | 5/2001 ................ F02G 5/00 |
| JP | 2006-249942 | A | | 9/2006 |

OTHER PUBLICATIONS

Chinese Office Action issued Mar. 23, 2015 in related Chinese Application No. 201280014051.9 with an English translation.
European Search Report dated Jul. 24, 2014 issued in the corresponding EP application No. 12764077.9.
Notice of Allowance effective Jun. 24, 2015 issued in the corresponding Saudi Arabian Application No. 112330409.
International Preliminary Report on Patentability (Forms PCT/IB/373 and PCT/ISA/237) for International Application No. PCT/JP2012/056022, dated Oct. 17, 2013, with an English translation.
International Search Report and Written Opinion of the International Searching Authority (Forms PCT/ISA/210, PCT/ISA/220, and PCT/ISA/237) for International Application No. PCT/JP2012/056022, dated Apr. 17, 2012.
Japanese Notice of Allowance for Japanese Application No. 2011-077389, dated Jun. 25, 2013, with an English translation.
Korean Office Action issued Aug. 21, 2014 in corresponding Korean Application No. 10-2013-7025126 with an English translation.
Notice of Allowance effective Sep. 21, 2015 issued in corresponding Chinese Application No. 201280014051.9 with an English Translation.

* cited by examiner

INTAKE AIR COOLING APPARATUS FOR STATIONARY INTERNAL COMBUSTION ENGINE

TECHNICAL FIELD

The present invention relates to a water-saving intake air cooling apparatus for a stationary internal combustion engine, which can be installed especially in a region where water is valuable and an outside air temperature is high.

BACKGROUND ART

Intake air supplied to a combustion chamber formed in a cylinder of an internal combustion engine is cooled by a cooler before being supplied to the combustion chamber in order to improve a charging efficiency. In an internal combustion engine having a turbo charger in particular, intake air compressed by a compressor of the turbo charger is normally heated to 100 to 200° C., and therefore a heat exchanger is provided in an intake air passage on an outlet side of the compressor in order to cool the heated intake air. Heat removed from the intake air by the heat exchanger is then discharged into the atmosphere by a radiator or the like.

Patent Document 1 discloses an intake air cooling apparatus for an internal combustion engine, which includes an absorption chiller that supplies a low temperature refrigerant to a cooler that cools intake air. This apparatus will now be described using FIG. 3 (FIG. 2 of Patent Document 1). In FIG. 3, an exhaust pipe 102 and an intake pipe 104 are connected to a diesel gas engine 100. An exhaust gas passage 106 for discharging exhaust gas from the diesel gas engine 100 to the outside is connected to the exhaust pipe 102, and an intake air passage 108 for introducing outside air is connected to the intake pipe 104.

A turbo charger 110 is provided to straddle the exhaust pipe 102 and the intake pipe 104. In the turbo charger 110, an exhaust gas turbine 112 provided in the exhaust pipe 102 and a compressor 114 provided in the intake pipe 104 are formed integrally via a shaft 116. A heat exchanger 118 is interposed in the intake pipe 104. A pipeline 120 is provided between the heat exchanger 118 and an absorption chiller 122. The pipeline 120 extends into a heat exchanger 124 of an evaporator forming the absorption chiller 122. Cooling water is supplied from the absorption chiller 122 to the heat exchanger 118 through the pipeline 120.

The exhaust gas passage 106 and a heat exchanger 126 for a generator forming the absorption chiller 122 are connected by a pipeline 128. An exhaust gas heat exchanger 130 connected to the pipeline 128 is provided in the exhaust gas passage 106.

Thermal energy recovered from exhaust gas (e) flowing through the exhaust gas passage 106 by the exhaust gas heat exchanger 130 is transferred to the generator heat exchanger 126 through the pipeline 128 using steam as a medium. The absorption chiller 122 is operated by this thermal energy and cooling water transferred from a cooling tower or the like. When the absorption chiller 122 is operated, cooling water flowing through the heat exchanger 124 of the evaporator is cooled. The cooling water cooled by the heat exchanger 124 is transferred to an air cooler 118 in order to cool intake air (a) flowing through the intake pipe 104.

In this intake air cooling apparatus, the absorption chiller 122 that consumes little power is used, and heat possessed by the exhaust gas (e) is used as a heat source of the absorption chiller 122. As a result, an improvement in thermal efficiency can be achieved.

Note that FIG. 3 of Patent Document 1 discloses an example in which heat possessed by the cooling water after cooling the diesel gas engine 100 is used as the heat source of the absorption chiller.

Patent Document 1: Japanese Patent Application Publication S58-79618

Typically, a cooling tower is provided together with the absorption chiller, and the cooling water supplied to the evaporator and an absorber is cooled in the cooling tower using the latent heat of vaporization of water. For this purpose, the cooling tower requires a large amount of water. Further, when high temperature outside air is used as intake air in a region where an outside air temperature is high, such as a tropical region, the intake air compressed by the turbo charger is heated to a high temperature. Therefore, a unit that can cool high temperature intake air highly efficiently is required. Hence, when a stationary internal combustion engine is installed in a region where water is valuable or a region having a high air temperature such as a tropical region, it is difficult to obtain sufficient output.

DISCLOSURE OF THE INVENTION

The present invention has been designed in consideration of this problem in the related art, and an object thereof is to realize a water-saving intake air cooling apparatus that consumes a small amount of water and can reduce an intake air temperature highly efficiently even when employed in a stationary internal combustion engine installed in a region where water is valuable such that water shortages tend to occur or a region where an outside air temperature is high.

To achieve this object, an intake air cooling apparatus for a stationary internal combustion engine according to the present invention is an intake air cooling apparatus for a stationary internal combustion engine in which a turbo charger is provided in an intake air passage and an exhaust gas passage, including: a first intake air cooler provided in the intake air passage on an upstream side of a compressor forming the turbo charger in order to perform primary cooling on intake air; a second intake air cooler for performing secondary cooling on the intake air on an outlet side of the compressor after the intake air is compressed and heated by the compressor; an absorption chiller that uses heat possessed by exhaust gas from the stationary internal combustion engine as a heat source and supplies cooling water for cooling the intake air to the first intake air cooler and the second intake air cooler; and a heat exchanger that cools cooling water by performing heat exchange between the cooling water and outside air and supplies the cooling water to the absorption chiller as a cold source, wherein intake air supplied to a combustion chamber of the stationary internal combustion engine is cooled by the first intake air cooler and the second intake air cooler.

In the apparatus according to the present invention, the outside air introduced into the intake air passage is first subjected to primary cooling by the first intake air cooler on the upstream side of the turbo charger. In so doing, even outside air having a very high temperature, for example outside air having a temperature of approximately 50° C., can be cooled and introduced into the turbo charger. Next, the intake air that has been compressed and heated by the compressor forming the turbo charger is cooled by the second intake air cooler on the downstream side of the turbo charger, and then supplied to the combustion chamber of the stationary gas engine.

The cooling water for cooling the intake air in the first intake air cooler and the second intake air cooler is cooled by the absorption chiller. Since the absorption chiller, which consumes little power, is used as a unit for cooling the cooling water that cools the intake air, and since heat possessed by the exhaust gas and outside air are supplied to the absorption chiller as a heat source and a cold source, respectively, an extra heat source is not required. As a result, energy can be conserved and an improvement in cooling efficiency can be achieved.

Furthermore, the heat exchanger that cools the cooling water serving as the cold source of the absorption chiller uses outside air as a cold source and does not therefore require water. Accordingly, problems do not arise even in a region where water is in short supply. Hence, the intake air cooling apparatus according to the present invention can be operated while conserving energy and exhibiting high efficiency even in a region where water is valuable and the outside air temperature is high.

In the apparatus according to the present invention, the second intake air cooler is preferably constituted by a high temperature side intake air cooler that cools the high temperature intake air compressed by the turbo charger, and a low temperature side intake air cooler that further cools the intake air cooled by the high temperature side intake air cooler and then supplies the cooled intake air to a cylinder, a second heat exchanger is preferably provided to supply cooling water that has been cooled by exchanging heat with outside air, to the high temperature side intake air cooler, and cooling water is preferably supplied to the low temperature side intake air cooler from the absorption chiller, while the cooling water used for intake air cooling in the high temperature side intake air cooler is returned to the second heat exchanger through a cooling water jacket of the stationary internal combustion engine.

According to this configuration, the cooling water cooled by the absorption chiller is supplied to the low temperature side intake air cooler and the cooling water cooled by the second heat exchanger is supplied to the high temperature side intake air cooler. By dividing the cooling subjects in this manner, the absorption chiller is sufficient despite having a smaller cooling capacity than a vapor compression chiller or the like.

Further, the high temperature side intake air cooler exchanges heat with the high temperature intake air on the downstream side of the compressor, and therefore the temperature of the cooling water does not have to be reduced greatly. Hence, the second heat exchanger that uses outside air as a cold source is sufficient. Furthermore, since the second heat exchanger uses outside air as a cold source and does not therefore require water, the second heat exchanger can be operated in a region where water is in short supply.

The apparatus according to the present invention preferably further includes: an exhaust gas boiler provided in the exhaust gas passage of the stationary internal combustion engine; and a steam supply passage that supplies at least apart of steam obtained in the exhaust gas boiler to the absorption chiller, wherein the steam is supplied as a heat source of the absorption chiller. Thus, the heat possessed by the exhaust gas can be recovered efficiently and used as the heat source of the absorption chiller. Further, the remaining steam can be used as a heat source of another device.

The apparatus according to the present invention preferably further includes: a cooling water circulation passage that circulates the cooling water between the absorption chiller and either the second intake air cooler or the low temperature side intake air cooler; a bypass passage that is connected between an outward passage and a return passage of the cooling water circulation passage in order to return the cooling water that has been subjected to heat exchange with the intake air compressed and heated by the turbo charger and has been discharged from the second intake air cooler or the low temperature side intake air cooler, to the second intake air cooler or the low temperature side intake air cooler without passing through the absorption chiller; a valve mechanism capable of varying a flow rate of the cooling water flowing through the bypass passage; and a controller that controls the valve mechanism such that an amount of cooling water supplied to the absorption chiller is controlled in accordance with a load of the stationary internal combustion engine. Thus, the temperature flow rate of the cooling water supplied to the second intake air cooler or the low temperature side intake air cooler can be controlled by the controller in accordance with the load of the stationary internal combustion engine.

The apparatus according to the present invention preferably further includes: a temperature sensor that detects a temperature of the cooling water supplied from the absorption chiller to the second intake air cooler or the low temperature side intake air cooler; and a controller that controls an operation of the absorption chiller such that a detection value of the temperature sensor reaches a target value. Thus, the temperature of the cooling water supplied to the absorption chiller or the low temperature side intake air cooler can be controlled to a target temperature.

The apparatus according to the present invention preferably further includes: a third heat exchanger that performs heat exchange between the outside air and lubricating oil that circulates through a lubricating oil space formed in a housing of the stationary internal combustion engine in order to cool the lubricating oil; and a lubricating oil circulation passage that communicates with the lubricating oil space in order to lead the lubricating oil to the third heat exchanger. Thus, the lubricating oil that circulates through respective parts in the housing can be cooled by the third heat exchanger. Moreover, the third heat exchanger does not use water as a cold source and can therefore be operated in a region where water is in short supply.

With the apparatus according to the present invention, an intake air cooling apparatus for a stationary internal combustion engine in which a turbo charger is provided in an intake air passage and an exhaust gas passage includes: a first intake air cooler provided in the intake air passage on an upstream side of a compressor forming the turbo charger in order to perform primary cooling on intake air; a second intake air cooler for performing secondary cooling on the intake air on an outlet side of the compressor after the intake air is compressed and heated by the compressor; an absorption chiller that uses heat possessed by exhaust gas from the stationary internal combustion engine as a heat source and supplies cooling water for cooling the intake air to the first intake air cooler and the second intake air cooler; and a heat exchanger that cools cooling water by performing heat exchange between the cooling water and outside air and supplies the cooling water to the absorption chiller as a cold source, wherein intake air supplied to a combustion chamber of the stationary internal combustion engine is cooled by the first intake air cooler and the second intake air cooler. Hence, a specialized heat source is not required to operate the absorption chiller, and therefore energy can be conserved and high efficiency can be realized during an operation. Further, the intake air is cooled in two stages, and therefore, even when high temperature outside air is introduced as the intake air, the intake air supplied to the combustion chamber can be cooled to a target temperature. Moreover, water is not used as the cold source of the absorption chiller, and therefore the apparatus can be operated without problems even in a region where water is valuable. As a result, an intake air cooling apparatus suitable for use in a region where water is valuable and the outside air temperature is high can be realized.

BEST MODE FOR CARRYING OUT THE INVENTION

Figure 1:
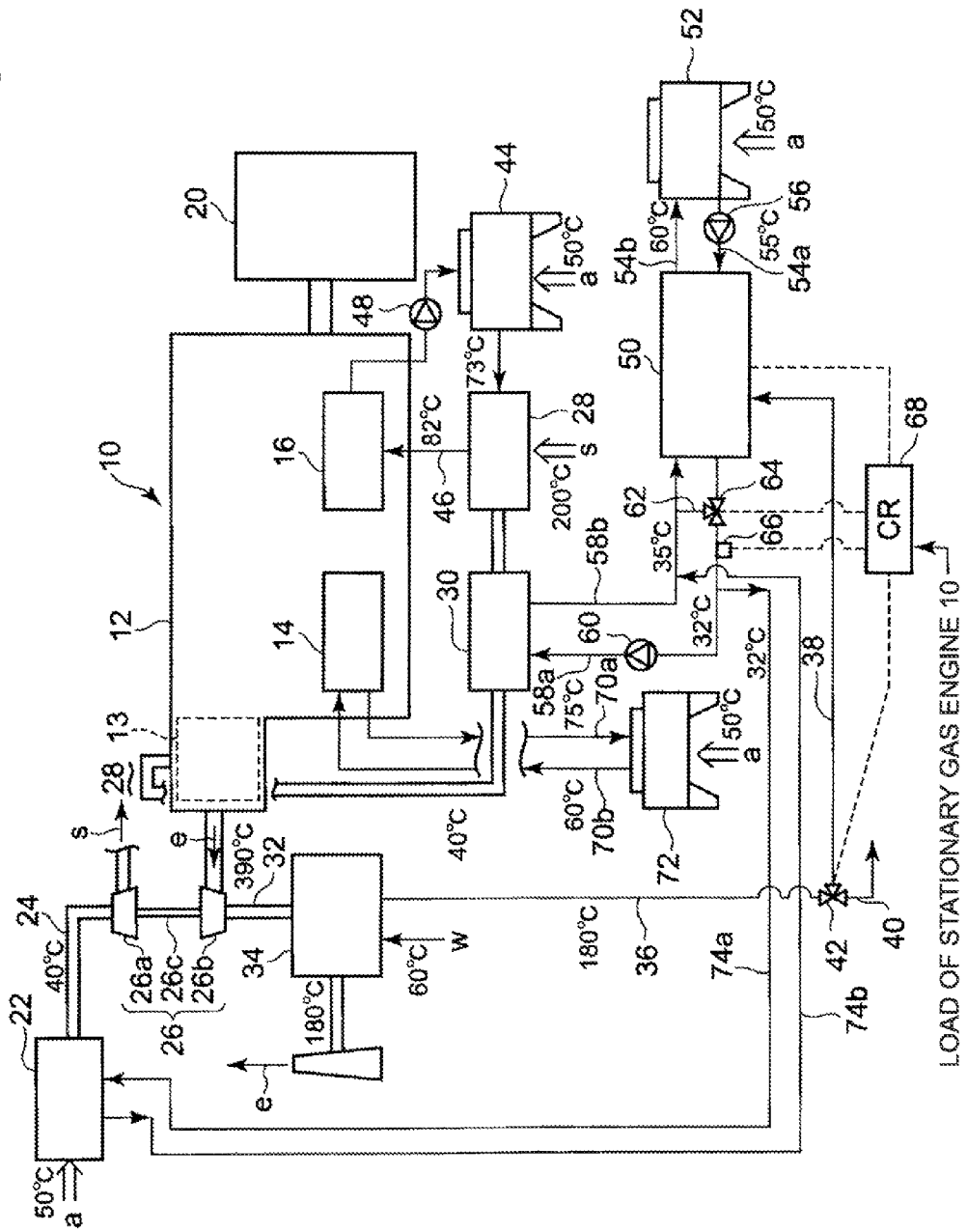
FIG. 1 is an overall block diagram showing an embodiment in which the present invention is applied to a stationary gas engine.

The present invention will be described in detail below using an embodiment illustrated in the drawings. Note, however, that unless specific description is provided to the contrary, dimensions, materials, shapes, relative arrangements, and so on of constitutional components described in this embodiment are not intended to limit the scope of the present invention.

Figure 2:
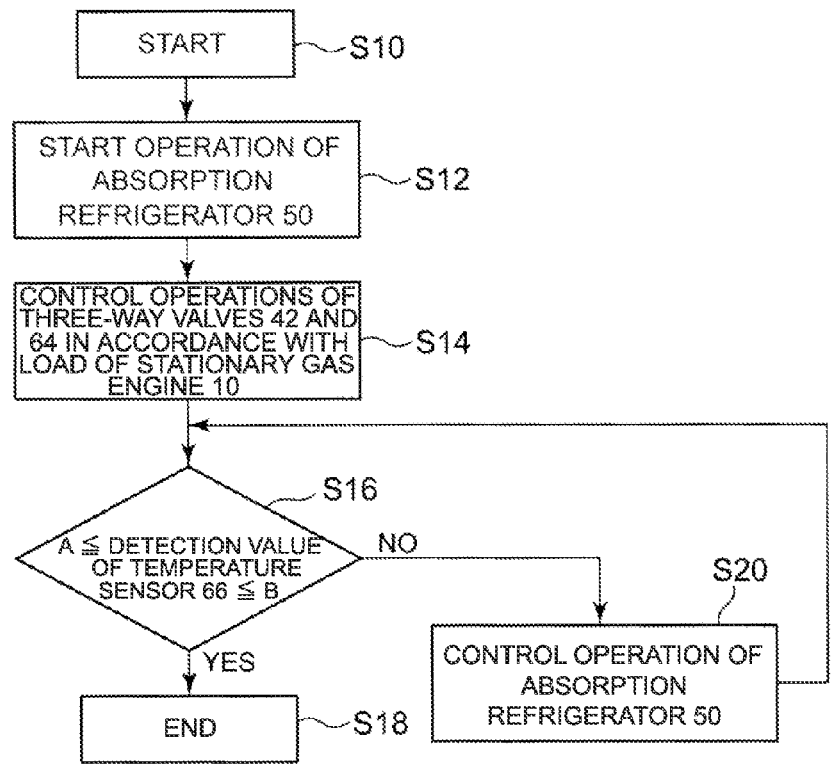
FIG. 2 is a flowchart showing operation procedures of this embodiment.
Figure 3:
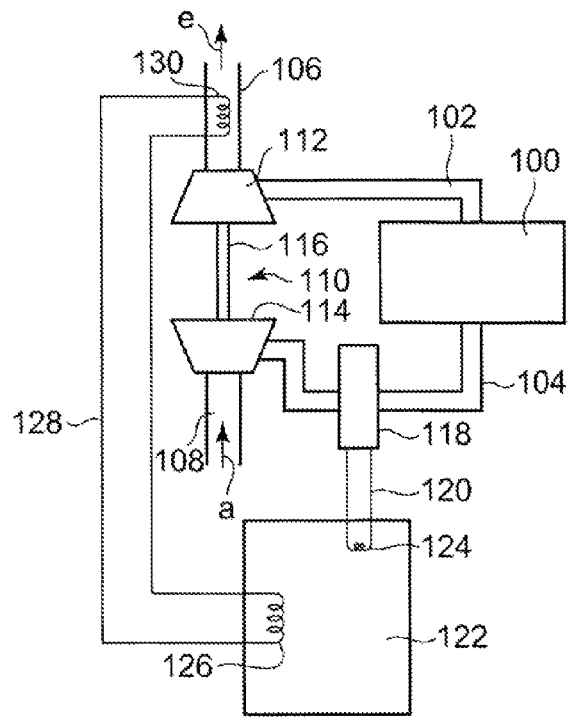
FIG. 3 is a block diagram showing a conventional intake air cooling apparatus for an internal combustion engine.

An embodiment in which the present invention is applied to a stationary gas engine disposed in a region where an air temperature is high and water shortages tend to occur, for example an arid tropical region, will now be described on the basis of FIGS. 1 and 2. In FIG. 1, a housing 12 of a stationary gas engine 10 is provided with a combustion chamber 13 formed in a plurality of cylinders, a lubricating oil circulation passage 14 for supplying lubricating oil to respective parts in the housing 12, and a cooling water jacket 16 for cooling the respective parts in the housing 12 using cooling water. Note that the combustion chamber 13, the lubricating oil circulation passage 14, and the cooling water jacket 16 are illustrated in pattern form in FIG. 1. The stationary gas engine 10 is connected to a power generator 20 via a flywheel.

An intake system of the stationary gas engine 10 includes a primary intake air cooler 22 that performs primary cooling on taken-in outside air (a). A compressor 26a forming a part of a turbo charger 26 is provided in an intake air passage 24 on a downstream side of the primary intake air cooler 22. A high temperature side intake air cooler 28 and a low temperature side intake air cooler 30 are interposed in the intake air passage 24 on a downstream side of the compressor 26a. Intake air (s) that has been compressed and heated by the compressor 26a is subjected to secondary cooling by the high temperature side intake air cooler 28, then subjected to tertiary cooling by the low temperature side intake air cooler 30, and then supplied to the combustion chamber 13 of the stationary gas engine 10.

Exhaust gas e discharged from the combustion chamber 13 of the stationary gas engine 10 into an exhaust gas passage 32 drives an exhaust gas turbine 26b provided in the exhaust gas passage 32. The exhaust gas turbine 26b and the compressor 26a are connected by a shaft 26c, and the turbo charger 26 is constituted by the compressor 26a and the exhaust gas turbine 26b. An exhaust heat boiler 34 is provided in the exhaust gas passage 32 on a downstream side of the exhaust gas turbine 26b. Raw material water (w) is supplied to the exhaust heat boiler 34, and steam is manufactured using heat possessed by the exhaust gas (e). The steam generated by the exhaust heat boiler 34 is supplied as a heat source to a generator (not shown) of an absorption chiller 50, to be described below, through pipelines 36 and 38.

A part of the steam is supplied as a heat source to other devices through a pipeline 40 that bifurcates from the pipeline 36. A three-way valve 42 is provided in a bifurcation portion between the pipelines 36 and 40, and the steam can be distributed between the pipeline 38 and the pipeline 40 using the three-way valve 42.

A cooling water circulation passage 46 is provided to circulate cooling water to the cooling water jacket 16, the high temperature side intake air cooler 28, and a second radiator 44. The second radiator 44 includes a mechanism such as a fan for taking in the outside air (a) and a heat exchange unit for performing heat exchange between the outside air (a) and the cooling water, and functions to cool the cooling water using the outside air (a). The cooling water cooled by the second radiator 44 is circulated through the cooling water circulation passage 46 in a direction of an arrow by a pump 48. This cooling water cools the intake air (s) in the high temperature side intake air cooler 28. The cooling water used to cool the intake air (s) in the high temperature side intake air cooler 28 is then transferred to the cooling water jacket 16 in order to cool the respective parts in the housing 12.

A first radiator 52 is provided together with the absorption chiller 50 to supply cooling water to the absorption chiller 50 for use as a cold source. The first radiator 52 is configured similarly to the second radiator 44. More specifically, the first radiator 52 includes an outside air intake mechanism and a heat exchange unit for performing heat exchange between the outside air (a) and the cooling water, and functions to cool the cooling water using the outside air a. The first radiator 52 and the absorption chiller 50 are connected by cooling water circulation passages 54a and 54b, and the cooling water is circulated between the first radiator 52 and the absorption chiller 50 by a pump 56 interposed in the cooling water circulation passage 54a.

As described above, steam is supplied to the absorption chiller 50 as a heat source through the pipelines 36 and 38, while cooling water is supplied as a cold source to a condenser and an absorber (not shown) from the first radiator 52. The absorption chiller 50 and the low temperature side intake air cooler 30 are connected via cooling water circulation passages 58a and 58b. The cooling water cooled by the absorption chiller 50 is circulated through the cooling water circulation passages 58a, 58b by a pump 60 interposed in the cooling water circulation passage 58a in order to cool the intake air (s) in the low temperature side intake air cooler 30.

A cooling water circulation passage 74a that supplies cooling water to the primary intake air cooler 22 is connected to the cooling water circulation passage 58a. A cooling water circulation passage 74b that returns the cooling water that has cooled the outside air (a) in the primary intake air cooler 22 to the cooling water circulation passage 58b is connected to the cooling water circulation passage 58b. Hence, cooling water is also supplied to the primary intake air cooler 22 through the cooling water circulation passage 74a that bifurcates from the cooling water circulation passage 58a in order to cool the outside air (a).

Further, lubricating oil circulation passages 70a and 70b that communicate with the lubricating oil circulation space 14 in order to lead the lubricating oil to the exterior of the housing 12 are provided, and the lubricating oil circulation passages 70a and 70b are connected to a third radiator 72 on the exterior of the housing 12. The third radiator 72 has a similar configuration to the first radiator 52 and the second radiator 44, including an outside air intake mechanism and a heat exchange unit. The third radiator 72 functions to cool the lubricating oil by taking in the outside air a and performing heat exchange between the taken-in outside air (a) and the lubricating oil.

A bypass passage 62 is provided between the cooling water circulation passages 58a, 58b further toward the absorption chiller 50 side than a connection portion of the cooling water circulation passages 74a, 74b. A three-way valve 64 is provided in a bifurcation portion between the cooling water circulation passage 58a and the bypass passage 62. A temperature sensor 66 that detects a cooling water temperature is provided in the cooling water circulation passage 58a. Further, a controller 68 is provided to control an operation of the absorption chiller 50. The controller 68 inputs a detection value from the temperature sensor 66, and controls the operation of the absorption chiller 50 on the basis of the detection value.

The controller 68 controls a flow rate of the steam supplied to the absorption chiller 50 by controlling an opening of the three-way valve 42. Further, by controlling an opening of the three-way valve 64 in accordance with a load of the stationary gas engine 10, the controller 68 controls an amount of cooling water distributed to the cooling water circulation passage 58a and the bypass passage 62.

A fixed amount of cooling water must be supplied to the low temperature side intake air cooler 30 at 32° C. The temperature of the cooling water discharged from the low temperature side intake air cooler 30 is likely to decrease below 35° C. or otherwise vary in accordance with the load of the stationary gas engine 10. Therefore, when the cooling water is supplied to the absorption chiller 50 as is, it is difficult to maintain the temperature of the cooling water supplied to the low temperature side intake air cooler 30 at 32° C. Hence, by controlling the opening of the three-way valve 64 using the controller 68 in order to control the amount of cooling water that bypasses the absorption chiller 50, the flow rate and the temperature of the cooling water supplied to the low temperature side intake air cooler 30 can be controlled to fixed levels.

By having the controller 68 control the operation of the absorption chiller 50 on the basis of the detection value from the temperature sensor 66 and control the three-way valves 42 and 64 in accordance with the load of the stationary gas engine 10 in this manner, the temperature and the flow rate of the cooling water supplied to the primary intake air cooler 22 and the low temperature side intake air cooler 30 can be maintained at fixed levels.

Set temperatures of the outside air (a), the intake air (s), the exhaust gas (e), the cooling water, and so on in the respective parts are noted in FIG. 1. In this embodiment, the temperature of the outside air a is set at 50° C., for example.

According to this configuration, the outside air (a) is suctioned into the primary intake air cooler 22 at 50° C. by a suction force of the compressor 26a. Cooling water at 32° C. is transferred to the primary intake air cooler 22 through the cooling water circulation passage 74a, and the suctioned outside air (a) is subjected to heat exchange with the cooling water supplied from the absorption chiller 50 in the primary intake air cooler 22. As a result, the outside air (a) is primarily cooled to 40° C. After cooling the outside air (a), the cooling water is returned to the absorption chiller 50 through the cooling water circulation passages 74b and 58b.

The primarily cooled intake air (s) is compressed and heated to 200° C. by the compressor 26a of the turbo charger 26. The intake air (s) heated to 200° C. is secondarily cooled in the high temperature side intake air cooler 28 by exchanging heat with cooling water supplied from the second radiator 44. The secondarily cooled intake air (s) is then tertiarily cooled to 40° C. in the low temperature side intake air cooler 30 by exchanging heat with 32° C. cooling water supplied from the absorption chiller 50. The intake air (s) subjected to tertiary cooling to 40° C. is supplied to the combustion chamber 13 of the stationary gas engine 10.

The exhaust gas (e) discharged from the combustion chamber 13 of the stationary gas engine 10 is introduced into the exhaust heat boiler 34. Steam is generated by the exhaust heat boiler 34 using the heat possessed by the exhaust gas (e). The steam is supplied to the absorption chiller 50 as a heat source through the pipelines 36 and 38. Cooling water is supplied to the absorption chiller 50 from the first radiator 52 as a cold source, and the absorption chiller 50 is operated by the heat source and the cold source. Cooling water is manufactured at 32° C. by the absorption chiller 50, and this cooling water is transferred to the primary intake air cooler 22 and the low temperature side intake air cooler 30 in order to cool the intake air s in the primary intake air cooler 22 and the low temperature side intake air cooler 30.

The cooling water cooled by the second radiator 44 is transferred to the cooling water jacket 16 on the downstream side of the high temperature side intake air cooler 28 in order to cool the respective parts in the housing 12. Further, the lubricating oil in the housing 12 is transferred from the lubricating oil circulation space 14 to the third radiator 72 through the lubricating oil circulation passage 70a and cooled in the third radiator 72. The lubricating oil cooled by the third radiator 72 is returned to the lubricating oil circulation space 14 through the lubricating oil circulation passage 70b.

Next, control procedures executed by the controller 68 will be described using a flowchart shown in FIG. 2. In FIG. 2, when the absorption chiller 50 starts to operate (S12), operations of the three-way valves 42 and 64 are controlled in accordance with a load condition of the stationary gas engine 10, whereby the temperature of the cooling water supplied to the primary intake air cooler 22 and the low temperature side intake air cooler 30 is regulated (S14).

Next, when the detection value from the temperature sensor 66, which is input into the controller 68, is within a set range (A≤temperature detection value≤B) (S16), the control is terminated (S18). When the detection value is outside the set range, the controller 68 controls the operation of the absorption chiller 50 (S20) such that the detection value enters the set range.

According to this embodiment, the outside air (a) introduced into the intake air passage 24 is cooled in three stages in the intake air passage 24 on the upstream side and the downstream side of the turbo charger 26, and therefore even outside air (a) having a temperature of 50° C. can be supplied to the combustion chamber 13 of the stationary gas engine 10 at a set temperature of 40° C. Further, cooling water manufactured by the absorption chiller 50, which uses the heat possessed by the exhaust gas (e) as a heat source and the outside air as a cold source and therefore consumes little power, is supplied to the primary intake air cooler 22 and the low temperature side intake air cooler 30 into which the low temperature intake air (s) is introduced, and therefore energy conservation and highly efficient cooling can be achieved without the need for a specialized heat source.

Furthermore, the first radiator 52, the second radiator 44, and the third radiator 72 all use the outside air (a) and do not require water. Therefore, the radiators 52, 44, 72 can be operated in a region where water is in short supply. Hence, the intake air cooling apparatus according to this embodiment can be operated highly efficiently even in an arid tropical region where water is valuable and water shortages tend to occur, and the outside air temperature is high.

Moreover, the cooling water supplied to the high temperature side intake air cooler 28 does not need to be greatly reduced in temperature, and therefore the second radiator 44 that uses the outside air (a) as a cold source is sufficient. Further, only the cooling water that is supplied to the primary intake air cooler 22 and the low temperature side intake air cooler 30 is cooled by the absorption chiller 50, and therefore the absorption chiller is sufficient despite having a smaller cooling capacity than a steam compression chiller. By combining the second radiator 44 and the absorption chiller 50, energy conservation and highly efficient cooling can be realized without the need for a specialized energy source.

Furthermore, the exhaust heat boiler 34 is provided in the exhaust gas passage 32 to manufacture steam using the heat possessed by the exhaust gas (e), and the manufactured steam is used as the heat source of the absorption chiller 50. Hence, the heat possessed by the exhaust gas (e) can be recovered efficiently. The remaining steam may be used as a heat source for another device.

Further, the three-way valve 42 is provided in the pipeline 36, the bypass passage 62 and the three-way valve 64 are provided in the cooling water circulation passages 58a, 58b, and the openings of the three-way valves 42 and 64 are controlled by the controller 68 in accordance with the load condition of the stationary gas engine 10, and therefore the temperature of the cooling water supplied to the primary intake air cooler 22 and the low temperature side intake air cooler 30 can be controlled in accordance with the load of the stationary gas engine 10.

Moreover, the temperature sensor 66 that detects the temperature of the cooling water is provided in the cooling water circulation passage 58a, and the operation of the absorption chiller 50 is controlled by the controller 68 on the basis of the detection valve from the temperature sensor 66 such that the temperature of the cooling water reaches a target temperature. Hence, the temperature of the cooling water supplied to the primary intake air cooler 22 and the low temperature side intake air cooler 30 can be controlled to a target value with a high degree of precision.

Furthermore, the temperature of the lubricating oil that lubricates the interior of the housing 12 can be reduced by the third radiator 72 that does not use water.

Note that in the embodiment described above, the stationary gas engine 10 is coupled to the power generator 20 via a flywheel, but the stationary gas engine 10 may be coupled to a pump and a compressor instead of the power generator 20 in order to drive these devices. Further, the present invention may also be applied to a stationary internal combustion engine other than a stationary gas engine.

INDUSTRIAL APPLICABILITY

According to the present invention, it is possible to realize an intake air cooling apparatus for a stationary internal combustion engine with which energy can be conserved and a high degree of cooling efficiency can be achieved, and which is therefore suitable for use in a region where water is valuable and an air temperature is high.

The invention claimed is:

1. An intake air cooling apparatus for a stationary internal combustion engine in which a turbo charger is provided in an intake air passage and an exhaust gas passage, comprising:
   a first intake air cooler provided in the intake air passage on an upstream side of a compressor forming the turbo charger in order to perform primary cooling on intake air;
   a second intake air cooler for performing secondary cooling on the intake air on an outlet side of the compressor after the intake air is compressed and heated by the compressor;
   an absorption chiller that uses heat possessed by exhaust gas from the stationary internal combustion engine as a heat source and supplies cooling water for cooling the intake air to the first intake air cooler and the second intake air cooler; and
   a heat exchanger that cools cooling water by performing heat exchange between the cooling water and outside air and supplies the cooling water to the absorption chiller as a cold source,
   wherein intake air supplied to a combustion chamber of the stationary internal combustion engine is cooled by the first intake air cooler and the second intake air cooler.

2. The intake air cooling apparatus for a stationary internal combustion engine according to claim 1, wherein the second intake air cooler is constituted by a high temperature side intake air cooler that cools the high temperature intake air compressed by the turbo charger, and a low temperature side intake air cooler that further cools the intake air cooled by the high temperature side intake air cooler and then supplies the cooled intake air to a cylinder,
   a second heat exchanger is provided to supply cooling water that has been cooled by exchanging heat with outside air, to the high temperature side intake air cooler, and
   cooling water is supplied to the low temperature side intake air cooler from the absorption chiller, while the cooling water used for intake air cooling in the high temperature side intake air cooler is returned to the second heat exchanger through a cooling water jacket of the stationary internal combustion engine.

3. The intake air cooling apparatus for a stationary internal combustion engine according to claim 2, further comprising:
   an exhaust gas boiler provided in the exhaust gas passage of the stationary internal combustion engine; and
   a steam supply passage that supplies at least a part of steam obtained in the exhaust gas boiler to the absorption chiller,
   wherein the steam is supplied as a heat source of the absorption chiller.

4. The intake air cooling apparatus for a stationary internal combustion engine according to claim 2, further comprising:
   a cooling water circulation passage that circulates the cooling water between the absorption chiller and either the second intake air cooler or the low temperature side intake air cooler;
   a bypass passage that is connected between an outward passage and a return passage of the cooling water circulation passage in order to return the cooling water that has been subjected to heat exchange with the intake air compressed and heated by the turbo charger and has been discharged from the second intake air cooler or the low temperature side intake air cooler, to the second intake air cooler or the low temperature side intake air cooler without passing through the absorption chiller;
   a valve mechanism capable of varying a flow rate of the cooling water flowing through the bypass passage; and
   a controller that controls the valve mechanism such that a temperature of the cooling water supplied to the absorption chiller is controlled in accordance with a load of the stationary internal combustion engine.

5. The intake air cooling apparatus for a stationary internal combustion engine according to claim 2, further comprising:
   a temperature sensor that detects a temperature of the cooling water supplied from the absorption chiller to the second intake air cooler or the low temperature side intake air cooler; and a controller that controls an operation of the absorption chiller such that a detection value of the temperature sensor reaches a target value.

6. The intake air cooling apparatus for a stationary internal combustion engine according to claim 2, further comprising:
    a third heat exchanger that performs heat exchange between the outside air and lubricating oil that circulates through a lubricating oil space formed in a housing of the stationary internal combustion engine in order to cool the lubricating oil; and
    a lubricating oil circulation passage that communicates with the lubricating oil space in order to lead the lubricating oil to the third heat exchanger.

7. The intake air cooling apparatus for a stationary internal combustion engine according to claim 1, further comprising:
    an exhaust gas boiler provided in the exhaust gas passage of the stationary internal combustion engine; and
    a steam supply passage that supplies at least a part of steam obtained in the exhaust gas boiler to the absorption chiller,
    wherein the steam is supplied as a heat source of the absorption chiller.

8. The intake air cooling apparatus for a stationary internal combustion engine according to claim 1, further comprising:
    a cooling water circulation passage that circulates the cooling water between the absorption chiller and either the second intake air cooler or the low temperature side intake air cooler;
    a bypass passage that is connected between an outward passage and a return passage of the cooling water circulation passage in order to return the cooling water that has been subjected to heat exchange with the intake air compressed and heated by the turbo charger and has been discharged from the second intake air cooler or the low temperature side intake air cooler, to the second intake air cooler or the low temperature side intake air cooler without passing through the absorption chiller;
    a valve mechanism capable of varying a flow rate of the cooling water flowing through the bypass passage; and
    a controller that controls the valve mechanism such that a temperature of the cooling water supplied to the absorption chiller is controlled in accordance with a load of the stationary internal combustion engine.

9. The intake air cooling apparatus for a stationary internal combustion engine according to claim 1, further comprising:
    a temperature sensor that detects a temperature of the cooling water supplied from the absorption chiller to the second intake air cooler or the low temperature side intake air cooler; and
    a controller that controls an operation of the absorption chiller such that a detection value of the temperature sensor reaches a target value.

10. The intake air cooling apparatus for a stationary internal combustion engine according to claim 1, further comprising:
    a third heat exchanger that performs heat exchange between the outside air and lubricating oil that circulates through a lubricating oil space formed in a housing of the stationary internal combustion engine in order to cool the lubricating oil; and
    a lubricating oil circulation passage that communicates with the lubricating oil space in order to lead the lubricating oil to the third heat exchanger.

\* \* \* \* \*